July 23, 1963
H. HERMANNY
3,098,553
TUBE CAGE ORIENTING AND POSITIONING APPARATUS
Filed June 16, 1960
5 Sheets-Sheet 1
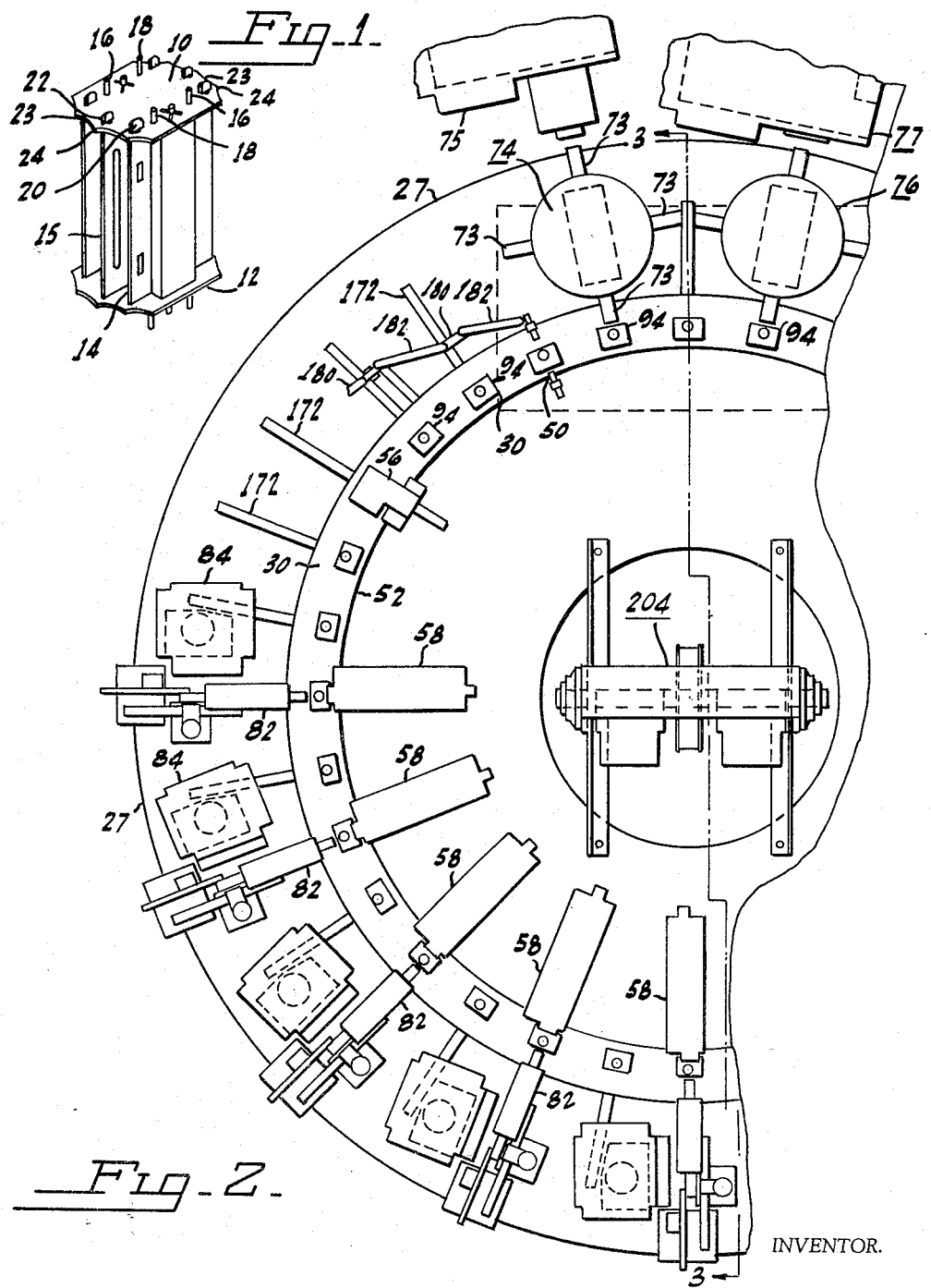
INVENTOR.
HEINRICH HERMANNY
BY William A. Zalesak
ATTORNEY

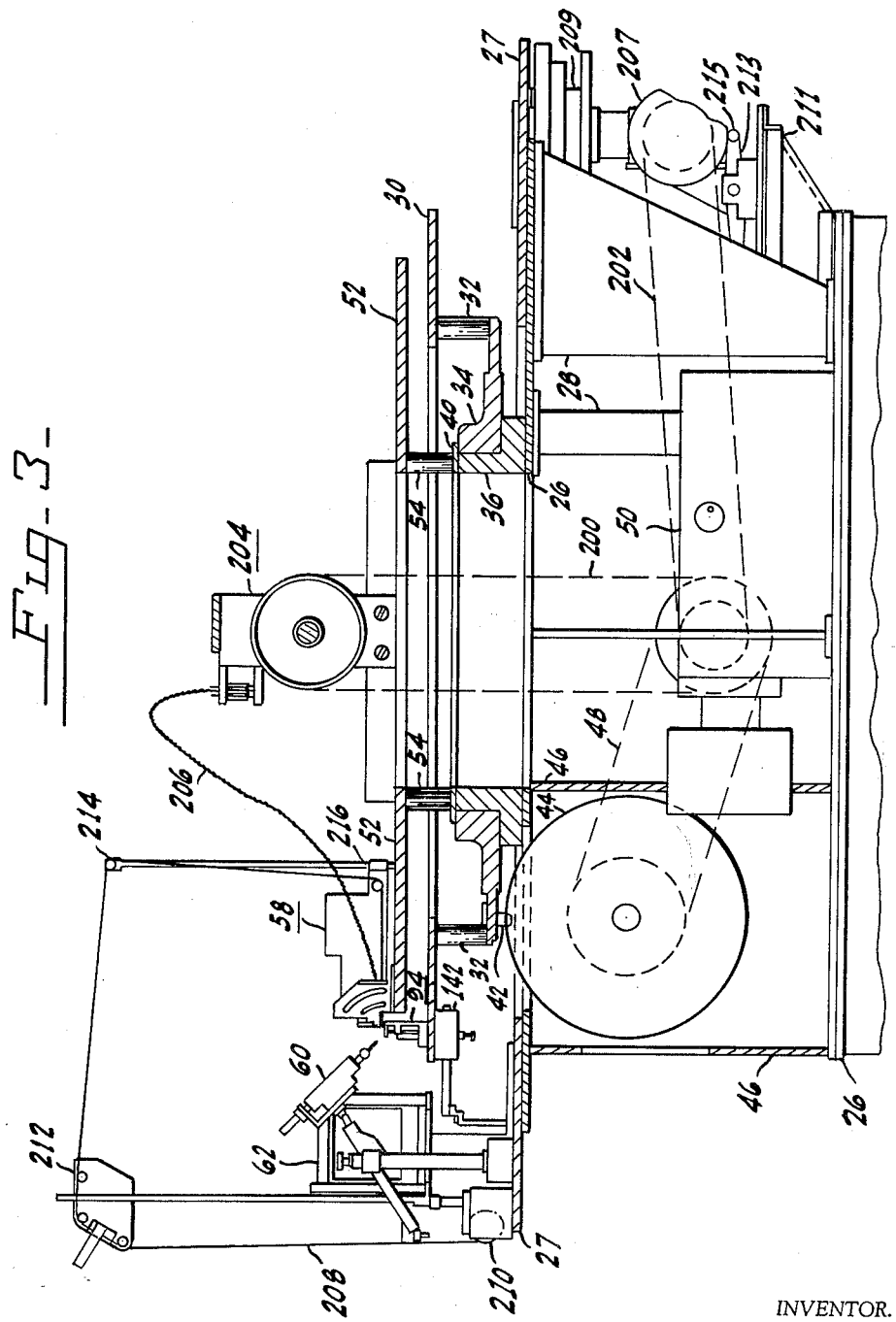

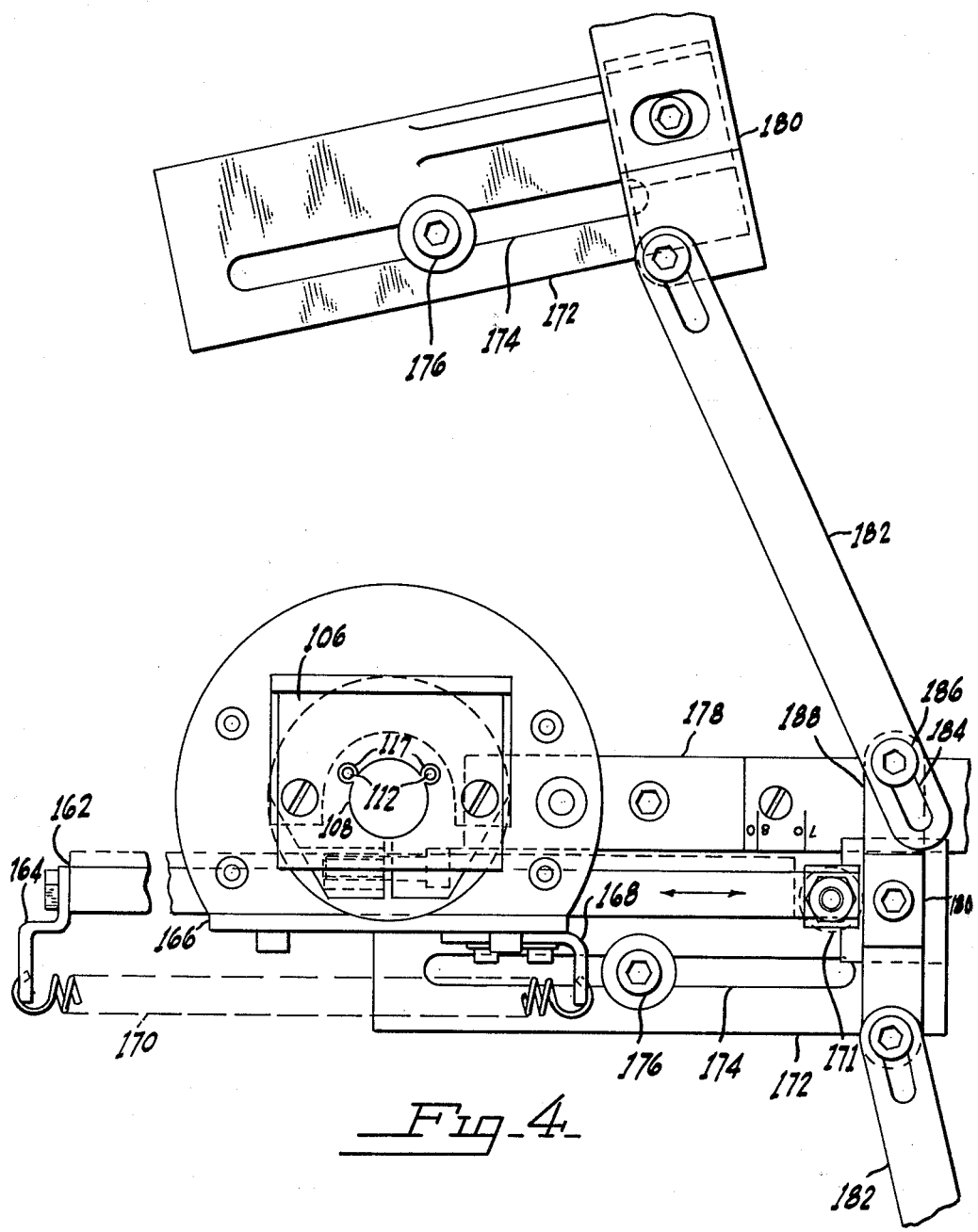

INVENTOR.
HEINRICH HERMANNY

United States Patent Office 3,098,553
Patented July 23, 1963

3,098,553
TUBE CAGE ORIENTING AND POSITIONING APPARATUS
Heinrich Hermanny, Cincinnati, Ohio, assignor to Radio Corporation of America, a corporation of Delaware
Filed June 16, 1960, Ser. No. 36,536
14 Claims. (Cl. 198—33)

My invention relates to apparatus for carrying work pieces to successive work stations and having means for holding and positioning the work piece to properly orient it to permit various and successive operations to be performed on the work piece at the successive work stations.

More particularly, my invention relates to apparatus including cage holders for holding and accurately positioning cage assemblies of a vacuum tube, moving the cage holders to successive work stations and rotating said cage holders at said work stations so that the cage assemblies are properly positioned for the operation to be performed thereon at the work stations.

A conventional vacuum tube electrode cage or cage assembly, in general, comprises tube elements, the axes of which are generally parallel and which may be concentric, held between end spacer members comprising insulating wafers, usually of mica. These wafers have apertures therein into which extensions of the electrode elements or the ends of their support members are inserted. The extensions, usually on the anode or plate, may be in the form of so-called ears. The micas are usually formed, at least in part, with cusps or points having indented or recessed portions therebetween spaced uniformly and symmetrically about at least a portion of the periphery of the mica.

In producing the completed cage assembly, various operations must be performed on the tube cage. When automatic machinery performs these operations, the tube cage must be moved to successive work stations and presented in proper position at each station to facilitate performance of these various operations in successive order.

It is therefore an object of my invention to provide apparatus for receiving, holding, positioning and orienting work pieces, more particularly tube cage assemblies, and moving said work pieces to successive work stations where various and successive operations are performed on said work pieces after being properly positioned and oriented.

It is a further object of my invention to provide a holder for a vacuum tube electrode cage and means to properly position said cage in said holder.

Another object of my invention is to provide a cage holder that includes initial cage locating means and other means for thereafter more accurately positioning said cage in said holder.

It is a further object of my invention to provide means for moving a cage holder and rotating the holder and therefore the cage, to a predetermined angular position at each work position for the purpose of presenting the cage in a proper position and properly oriented for successive operations to be performed on said cage.

In accordance with my invention, I provide a rotatable carrier or turret having supported thereon a plurality of cage holders in spaced positions around the carrier. The carrier is indexed to move the holders though a plurality of successive stations from a loading station through a plurality of work stations and to an unloading station.

Each cage holder comprises a U-shaped frame. One limb of the U-shaped frame has a hole therein with funnel edges for engaging one mica of a cage. A movable cage contacting jaw is mounted to slide through the other limb of the U-shaped frame for engaging the other mica of the cage. Parallel rod-like centering guide means are mounted in the frame parallel to the direction of motion of said contacting jaw.

In loading a carrier, the tube cage is moved transversely of the longitudinal axis of the holder so that the micas contact the centering guides at a region between the cusps on a mica. This action results in an initial positioning of the tube cage. The cage contacting jaw is moved to contact one of the micas and slide the tube cage along the guides until the other mica contacts the funnel edges in the other limb of the frame, resulting in a final positioning of the cage in the cage holder.

The cage holders are rotatably mounted on a support which is fixed to the cage holder carrier or turret. Means are provided for rotating the cage holder to a desired predetermined angular position at each of the indexed positions of the turret.

My invention will be best understood upon reference to the drawings forming part of this application and the detailed description thereof. In the drawings:

FIG. 1 is a perspective view of a cage of a vacuum tube to be manipulated by my machine;

FIG. 2 is a partial plan view, partially schematic, of apparatus made according to my invention;

FIG. 3 is a vertical sectional view of the machine of FIG. 2 taken on line 3—3 thereof;

FIG. 4 is a plan or top view of a cage holder and a cooperating cam means of the machine of FIG. 2;

Figure 5:
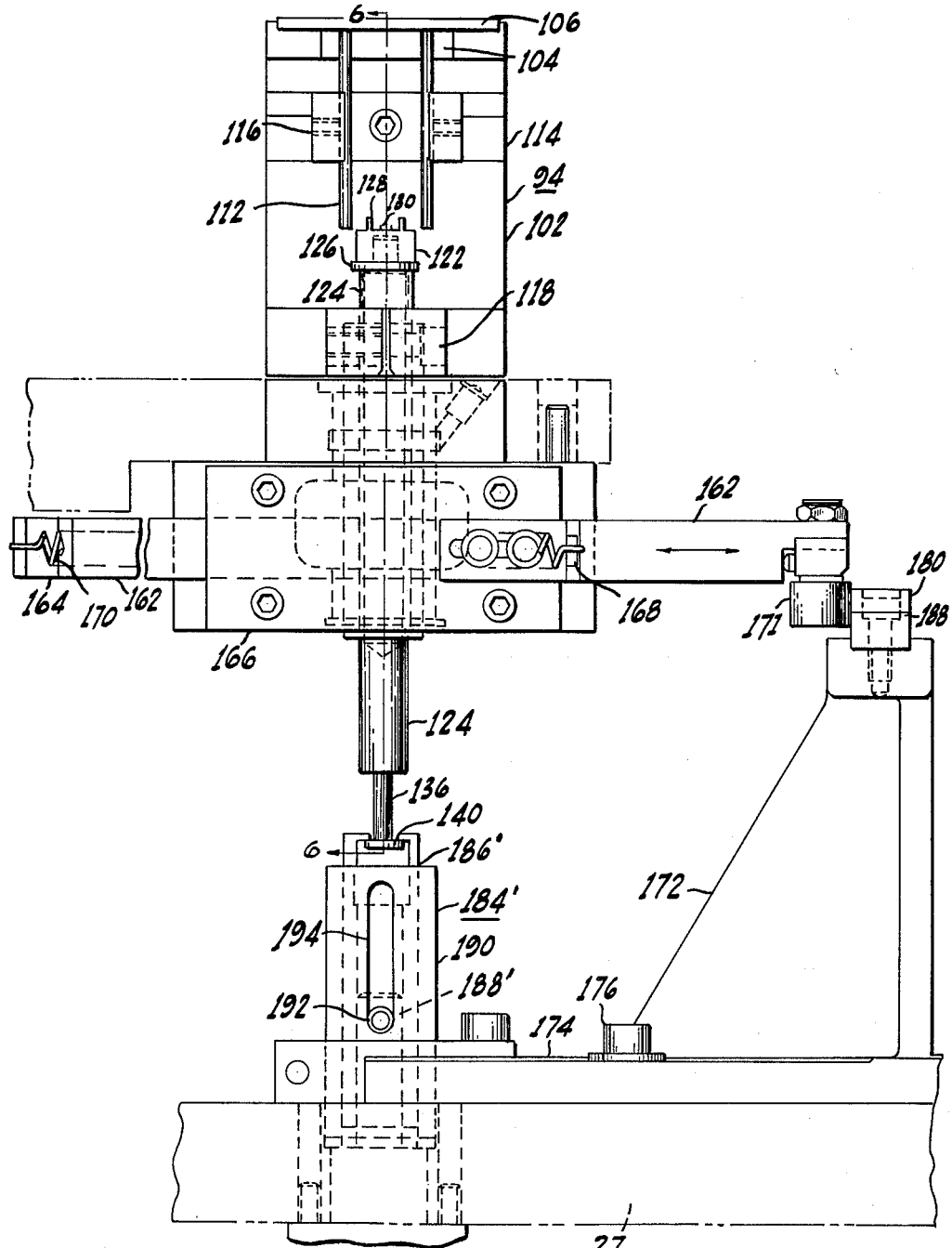
FIG. 5 is a side elevation view of the cage holder shown in FIG. 4 and of a so-called pull down means; and, FIG. 6 is a longitudinal section taken along the line 6—6 of FIG. 5.

One type of cage assembly which can be handled by apparatus made according to my invention comprises, as shown in FIG. 1, an upper mica 10 and a lower mica 12 arranged in spaced parallel planes, and having various tube elements or electrodes such as 14 and 15 supported therebetween. These electrodes may be sheet metal anodes or shields, for example. These electrodes 14 and 15 may be provided with ears 20 and 22 which extend through holes in the micas as shown in the drawing. Other electrodes such as grids, not shown, may be provided with side rod supports such as 16 and 18 which also extend through the micas. These ears and the side rod extensions provide means to which tabs can be welded. These tabs are to be welded to leads which in the finished tube extend through the tube envelope to permit appropriate voltages to be applied to the electrodes. Also, as indicated in the drawing, the micas have cusps or points 24 uniformly distributed along portions of the edges thereof and recesses or indentations 23 between each pair of points.

The tabs, mentioned above, are secured as by welding to the ears or side rod extensions, usually to the ends thereof beyond a mica. Tab wire is fed laterally to a fixed point at each of a number of tab welding stations. By indexing the cage holder carrier and by rotation of the cage holder in which a tube cage is held, a particular end of a tube element side rod, or a particular tube element ear, is presented to the fixed point to facilitate welding the tab to the support wire end or ear. The tab wire is then cut off at the welding station, after the welding operation, at a proper length as will be more fully explained below.

A general explanation of my device in handling tube cages such as is described above will be given with reference to FIG. 2. Cages, such as is shown in FIG. 1, are brought to the loading station at 75, and they are placed individually into my clamping means 94 by the indexing feeder 74. The clamping means 94 is carried by an indexing turret 30 on which is mounted an ear twister station 56, where an ear 20 or 22 of the cage is twisted. A clamping means 94 is then carried to successive tab feeding and cutting means 58 and tab welding means 82, where tabs are welded to the tube element ends 16 and 18 or to the ears 20 and 22 and then the tabs are cut off. Eventually, the clamping means 94 arrive, successively, at the unloading station where an indexing unloader 76 removes cages from the successive clamping means 94. This indexing unloader then places the cages into the storage means 77. More detail explanation will be found below. The arrangement of tables 27, 30 and 52, of which 27 and 52 are stationary, and 30 is indexably rotatable, will be described first.

Turning to FIG. 3, brackets 28, 28 are mounted on a stationary support frame 26. An annular stationary table 27 is mounted on support frame 26 by way of brackets 28, 28 and extends radially outwardly therefrom. A bearing support 36 is mounted on table 27. Ring 34 is rotatably mounted on the bearing support 36 and is held in place thereon by retaining ring 40. Pins 32, mounted on the periphery of ring 34, support a movable support means comprising a rotatable indexing turret 30. To rotatably index the turret, a drum-shaped indexing cam 44 is mounted in a frame 46 below the ring 34 in close proximity thereto. The drum cam 44 is driven by means of timing belt 48 and motor 50. Lugs or cam followers 42 are mounted at spaced intervals on the lower surface of ring 34. These followers 42 contact the cam surface (not shown) on the indexing cam 44 in a known manner to cause the turret 30 to be indexed one position upon each rotation of indexing cam 44.

Upper stationary support table 52 is supported from an upstanding portion of bearing support 36 above the turret 30 and concentric therewith by means of pins 54 positioned along the periphery of support 36. This table 52 is smaller in diameter than the turret 30 so that cage holders mounted on the outer portion of turret 30 clear table 52. The upper stationary table 52 supports the ear twister 56 (FIG. 2) and the tab feeding and cutting mechanisms 58. The welders 60 and the transformers 62 (FIG. 3) are mounted on lower table 27 opposite the tab feeding and cutting mechanism 58. The devices supported on members 27 and 30 will be described in more detail below.

Figure 6:
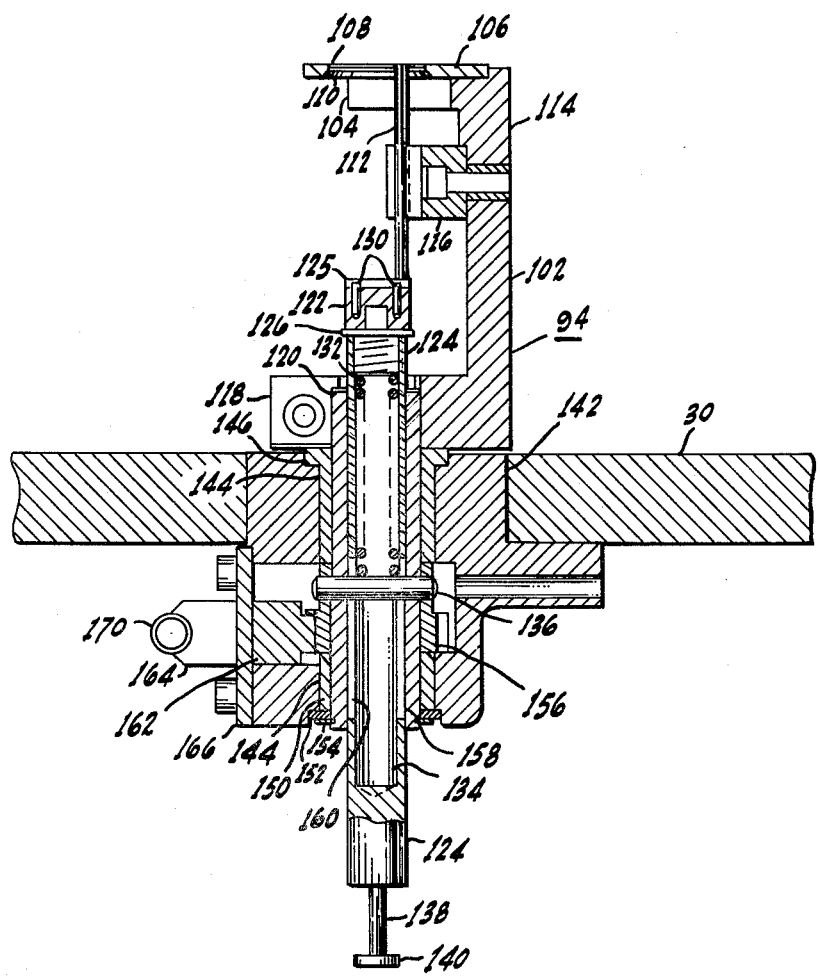

The cage or work engaging holder 94 and the means for orienting it may be better understood in connection with FIGS. 4, 5 and 6 and the following description thereof. As noted above, the cage holder and the orienting means therefor are mounted on turret 30.

The cage holder 94 comprises, in general, a cage engaging and positioning means. The cage engaging and positioning means comprises a cage housing or frame 102 of generally U-shape, the legs of the U being horizontally positioned. The upper leg 104 of the U-shaped housing 102 is bifurcated and an upper work engaging member comprising a mica centering plate 106 is fixed to the upper leg 104 between the bifurcations. The mica centering plate 106 has a hole 108 therein with funnel-shaped edges 110. Rod-like centering guides 112 are fastened in a direction perpendicular to plate 106, to a vertical portion 114 of the U-shaped housing 102 by means of a spacer 116. These rods 112 extend through further holes 117 in the centering plate 106 in the region of the funnel-shaped edges as shown in FIG. 4. The lower leg of the U comprises a clamping means 118 (FIGS. 5 and 6) by means of which the U-shaped housing 102 is clamped to a rotatable sleeve or spindle 120 (FIG. 6) which will be further described below.

The cage engaging and positioning means comprises further a cage contacting or work engaging means 122 threaded into the end of a plunger 124. The contacting means 122 comprises a flange 126 which rests on the end of the plunger 124. The contacting means is also provided with parallelly arranged raised tongues 128 on the upper or mica contacting end thereof. Pins 130, arranged parallel to the axis of the cage contactor 122 are set thereinto between the tongues 128. The tongues 128 contact the mica between the ends of the tube elements, or tube element supports, that extend through the mica. The pins 130 contact the ends of the cathode sleeves that extend below the mica spacer, and prevent the said sleeves from sliding down. It will be understood that the tongues 128 and the pins 130 will be adapted to the particular tube cage that is to be held by the cage holder, there being a pin 130 in said contactor means for each cathode in the cage.

The cage contactor 122, mounted in the top of plunger 124, is urged upwards towards the plate 106 by spring 132. The spring 132 is mounted in a bore 134 in the plunger 124 and is positioned between pin 136 and the lower end of cage contactor 122. The lower end of plunger 124 comprises a necked portion 138 between the head portion 140 and the body of the plunger 124. Thereby, a plunger portion is provided having variable transverse dimensions along the length thereof for a purpose to be described below.

The plunger 124 extends slidably through the sleeve 120 and rotates with it about an axis that extends through the hole 108 in the centering plate 106.

The cage holder orienting means comprises a gear housing 142 fastened to the underside of turret 30. A portion of said gear housing extends through the turret 30 and a portion thereof extends below the turret as shown in FIGS. 3 and 6. The gear housing 142 has a bore 144 therein in which is mounted at the upper end thereof a shouldered bearing 146. The rotatable sleeve 120 rotatably supports the cage holder 94 in the bearing 146. A cylindrical bearing 150 is provided in said bore 144 surrounding the lower end of said sleeve 120. The bearing 150 is held in place by the ring 152 and retaining ring 154 in a known manner. A pinion gear 156 is fastened to the sleeve 120 by means of the pin 136. The teeth of the pinion, being larger in diameter than the bore 144, prevents the sleeve from moving downward in the said bore. The sleeve 120 has a bore 158 therein in the direction of its length. The plunger 124 fits the bore 158 and is slidably arranged therein. The pin 136 extends not only through the pinion 156 and the sleeve 120 but also through the slots 160 in the plunger 124. In this manner the pinion 156 and the sleeve 120 and the plunger 124 are pinned together to rotate as a unit. However, the plunger 124 is slidable with respect to the sleeve 120 and the parts fastened thereto.

A rack 162 extends through the gear housing and meshes with pinion 156. The gear housing 142 is so mounted on the turret 30 that the rack extends in a radial direction. The centrally directed end of the rack 162 (FIGS. 4 and 5) has a bracket 164 fastened thereto. The rack 162 is held against the pinion 156 by means of a plate 166 which is fastened to gear housing 142. A further bracket 168 is also fastened to the plate 166. A spring 170 is stretched between the brackets 164 and 168, urging the rack 162 radially outward and in so doing tending to rotate the pinion 156. The outer end of the rack has a rotary cam follower 171 fastened thereto.

Also mounted on stationary table 27 are a plurality of cam supports 172 (see FIG. 5) one for each indexed position of the turret. A cam support 172 is in the form of a bracket and has slots 174 therethrough. Bolts 176 run through slots 174 into the lower stationary table 27. The cam support 172 may be adjusted radially of the turret by means of the slots 174 and bolts 176 combination in a known manner. A scale 178 (FIG. 4) is mounted on lower table 27 along the cam support 172 to indicate the adjusted position of the cam support. The cam supports 172 each supports cam means 180 at each indexed position of the turret. The several cam means are connected by connecting bars 182 by means of slots 184 in the ends of bars 182 and by bolts 186. The bolts 186 extend through the said slots 184 into the cam means 180 at a lower or cut-down portion 188 of the cam means 180. The outer motion of the rack 162 is stopped by contact of the cam follower 171 with a cam 180 in each of the indexed positions of the turret 30. The cam follower 171 is led from one cam 180 at one indexing position of the turret 30 to the next cam 180 in the next indexed position by the contact of the cam follower 171 on connecting bars 182.

As noted above, the plunger 124 of cage holder 94 may be pulled downward upon grasping head 140. A pull-down means 184' (FIG. 5) for the plunger 124 is mounted on the lower table 27 at the loading station 74 and another pull-down means is mounted at the unloading station 76 (FIG. 2). These pull-down means each comprise bracket arms 186' arranged to contact the upper edges of the head 140 at opposite sides of the neck 136. The bracket elements 186' form the top part of the slide 188'. Slide 188' slides in sleeve 190 and a pin 192 extends through the slide 188' and through the slot 194 in the sleeve 190.

The aforesaid motor 50 (see FIG. 3), which is mounted on mean support 26 and which drives the indexing cam 44 also drives timing belts 200 and 202. Belt 200 drives a cam station 204 for actuating the means 58 for feeding and cutting the tab wire, by means of flexible cable 206. Belt 202 drives a cam 207 and an indexing means 209. The indexing means converts the continuous motion of the belt into intermittent indexing motion for driving the indexing loader 74 and unloader 76, shown in FIG. 2. The indexing means 209 is mounted on bracket 211 which is itself mounted on support means 26. A lever 213 is also mounted on bracket 211. One end of lever 213 comprises a cam follower 215 which is held against cam 207 by spring means (not shown). The other end of lever 213 is adapted to pull down slide 188 (FIG. 5) in a known manner to operate it in accordance with the shape of the cam face.

As stated, cam means at cam station 204 actuates the tab wire cutter and feeder 58 by means of flexible cable 206. The tab wire 208 runs from supply spool 210 over pulley means 212, 214 and 216 to the tab feeder and cutting unit 58. The spool 210 and pulley 212 are supported in a conventional manner on lower table 27. Pulleys 214 and 216 are supported from the tab feeder and cutter 58.

For completeness, a general description of the various means used with my orienting cage holder 94 is given. Reference is made to FIG. 2. The indexing loader 74 comprises four arms 73 extending at 90° angles from the body of said loader 74, whereby pairs of said arms extend diametrically in opposite directions. In an indexed position of feeding loader 74, an arm 73 is extended slidingly towards the loading station 75 and the diametrically opposite arm 73 is extended slidingly towards the cage holder 94 at the loading station. The arm 73 extending towards the loading station cage storage means 75 grasps a tube cage held in said storage means between spring fingers (not shown) on the end of said arm 73. At the same time, the diametrically opposite arm 73 slides toward cage holder 94 and thrusts a cage held between such spring fingers against the rod 112 (FIG. 5) in cage holder 94. The cage is held so that the micas are in horizontal planes, whereby the edges of the micas contact the said rods 112. The arm 73 of the indexing loader 74 holds the cage against the centering rods 112 until the cage contactor 122 pushes the cage upwards into contact with the funnel hole edge, clamping it in such position, and then the indexing loader withdraws its cage holder arm 73. These pairs of diametrically opposite arms 73 are retracted in a sliding manner and the indexing loader 74 (FIG. 2) is indexed 90° whereupon the other pair of diametrically spaced arms act to pick up a cage from the loading station 75 and thrust another cage into the next cage holder 94.

The ear twister 56 moves vertically downward and in its lower position it clamps onto an ear of an electrode in the cage and rotates its clamping means to twist the ear. The ear twister then releases the ear and moves vertically upwards.

Each tab feeder and cutter 58 feeds tab wire to a predetermined point, where a tube element support end or ear is to be presented by my cage holder 94.

The electrodes of the welder 82 move laterally downward and clamp the end of the tab wire to the ear or tube support element end and weld the tab to the ear or end. The tab wire is then cut off at the proper length by the feeder and cutter 58 while the welder electrodes move back to their original position.

The cage unloader 76 which operates similarly to the cage holder 74, grasps a cage which is held in cage holder 94. After the cage holder 94 has been opened by the pull down means 184 at the unloader to so permit, the unloader retracts the cage and indexes to a position where the cage is thrust into a storage means 77.

Since the storage means 75 and 77, the loader 74 and 76, the ear twister 56, the tab feeder and cutters 58, the welders 82 and their transformers 84 are not part of my invention, no further description thereof appears necessary.

The operation of my device is as follows:

A cage holder 94 is arranged at each of the several indexing positions of the turret 30 and is carried by it. At each indexing position of the turret, the cage holder 94 is oriented with respect to the first support table 27 as follows: The rack 162 is urged outward by the spring 170 until it is stopped by the pressing of the cam roller 171 supported by said rack 162 against the cam means 180. The rack 162 is in mesh with the pinion 156 whereby longitudinal motion of the rack causes rotary motion of the pinion. The pinion 156 is fixed to the sleeve 120 and slidably fixed to the plunger 124. Since the cage contactor 122 is fixed to the plunger 124 and other rotary parts of the cage holder 94 are fastened to the sleeve 120, the cage holder takes the angular position determined by the cam positioning means 180.

A pull-down means 184' described above is provided at the loading and at the unloading station. The bracket 186' of the pull-down means 184' clasps the head 140 on the plunger 124 and is pulled down by operation of cam 207 on lever 213 as noted above. In sliding down, it pulls down the plunger 124 and the elements that are mounted thereon, including the cage contactor 122, against the opposition of the spring 132. The indexing feeder 74 then pushes a cage, such as the one shown in FIG. 1, in a horizontal direction and parallel to the plane of the micas 10 and 12 into the cage housing 102 until the micas 10 and 12 contact the centering guides 112 between pairs of cusps or points on the micas. In this manner the cage is held in vertical position with the micas horizontal and with the upper mica in an approximate registration with the hole 108 in the mica centering plate 106. As the cam 207 rotates, the pull-down means is permitted to rise, whereby the spring 132 pushes the cage contactor 122 up. The cage slides along the guides 112 until the cusps on the upper mica contact the funnel edges 110 of the hole 108 in the mica centering plate 106 and the cage is accurately centered and clamped thereby. This funnel action to center the second mica is necessary since the mica is cut with +/−0.004 of an inch tolerance and this tolerance is too great to permit accurate positioning of the tube cage using the mica and the guides and without the funnel action. The indexing feeder arm 73 is withdrawn when the upper mica engages the mica centering plate at its funnel edges. The cage is held in the cage holder 94 by the cage contactor 122 pressing the cage upward to thereby hold the upper mica 10 against the said funnel edges 110.

The turret 30 then rotates to its next indexed position and it carries the cage holder 94 with it, the rotary cam follower 171 moving along the connecting bars 182 supplied for that purpose as noted above. In its next indexed position, the rotary cam follower is urged against the cam positioning means 180 at that indexed position. Thereby the cage holder 94, and therefore the cage contained therein, takes the desired predetermined rotary position with respect to the turret 30 for that indexed position thereof. For example, the cage is so presented at the position of the ear twister 56 that the ear twister, which moves vertically but not horizontally, will be in registry with the ear 20 or 22 which is to be twisted. The ear twister 56 twists an ear of an element sticking up through a hole in the upper mica for the purpose of holding the mica in place and also to present the twisted ear at the proper orientation for welding a tab thereto in a later operation. Similarly, when the turret is indexed to a further position where a tab is to be welded to a tube element, the end 16 or 18 of a tube element, or the twisted ear 20 or 22 is presented to the point where the tab wire is fed by the tab feeding unit 58 and to where the spot welding unit 82 will present its electrodes for welding the tab to that tube element. The tabs are then cut off at such lengths that the cage with the tabs welded thereto may fall through the hole 108 in the mica centering plate 106 upon release of the cage at the unloading station 76.

It is understood that the cage may be fed to the cage holder 94 by hand, as by moving the cage into the turret with its micas perpendicular to the guides 112 and into contact with guides 112. The cage is held against the slides or guides 112 while the cage contactor 122, in pushing against the lower mica, pushes the cage along the guides until the upper mica touches and is positioned by the funnel hole edge 110.

This invention and its operation can be understood from the above description. It is clear that any operation that requires particular orientation of a work piece held in a cage holder may be performed in any of the several positions of the turret. Therefore, the operations that take place herein, as, for example, the ear twister and the tab feeder, welder and cutting mechanism, are each mentioned in an exemplary manner only.

While my device is described for orienting and positioning tube cages, it can obviously orient and position any article that can be held between cooperating clamping jaws.

What is claimed is:

1. Apparatus for moving a work holder through successive work positions and rotating said work holder at each of said positions to position a work piece carried by said work holder at different angular positions at said work position to a tool to be applied to said work piece, including a support, a turret rotatably mounted on said support, means for rotating and indexing said turret to move the work holder to successive positions, said work holder having clamping means thereon for engaging a work piece, said clamping means including a rotatable sleeve mounted on said turret for rotation therewith, means for rotating said sleeve, a clamping jaw fixed to said sleeve for rotation therewith, a slidable member extending through said sleeve and fastened thereto for rotation therewith and slidable along the axis of said sleeve, said slidable member having a clamp on one end thereof for cooperation with said clamping jaw, biasing means associated with said slidable member for biasing said clamp to clamping position with respect to said clamping jaw, and a means positioned adjacent said turret at a work position for engaging said slidable member whereby said clamp may be moved to non-clamping position.

2. Apparatus for moving a tube cage assembly to successive work stations and accurately holding and positioning said cage assembly at said work stations at different angular positions to permit welding operations and other operations to be performed on said cage assemblies, said apparatus including a supporting frame, a rotatable turret mounted on said frame, means connected to said turret for rotating and indexing said turret, a plurality of rotatable work engaging means rotatably mounted on said turret and spaced around said turret, means connected to each of said work engaging means for rotating said work engaging means and including a gear connected to said work engaging means, and a rack in mesh therewith, said rack having a cam follower mounted thereon, cam means mounted on said frame, means connected to said rack for biasing said cam follower into engagement with said cam means whereby the angular position of said work engaging means at each of said work positions is determined by said cam and cam follower, said work engaging means comprising a U-shaped frame having at one end thereof means for engaging one end of a tube cage assembly and having at the other end thereof a movable clamping means movable toward and from said assembly engaging means whereby a cage assembly may be supported therebetween, said clamping means having an extension thereon and means for biasing said extension and said clamping means toward said cage engaging means, a pull-down device mounted on said frame and means on said extension for engaging said pull-down device for moving said clamping means away from said cage engaging means.

3. Apparatus for supporting and moving a cage to successive positions including, an indexable turret, a stationary support frame, pull-down means on said stationary frame at an indexed position of said turret, cage holder means supported on said turret for movement therewith, said cage holding means comprising a slidable plunger and a plate means arranged transversely of said slidable plunger, the distance between said plate means and said turret being fixed, means for biasing said slidable plunger towards said plate means, said slidable plunger having a portion cooperating with said pull-down means.

4. A cage holding means comprising a gear housing, a gear means mounted for rotation in said gear housing, a rack meshing with said gear means and extending through said gear housing, a sleeve extending through said gear means and fixed thereto for rotation therewith about an axis, a clamping jaw fixed to said sleeve, a plunger extending through said sleeve and fastened thereto for rotation therewith and slidable along said axis with respect to said sleeve, said plunger having a clamp on one end thereof for cooperation with said clamping jaw.

5. A cage holder for holding vacuum tube cages comprising parallelly arranged insulating wafers and tube elements arranged between the wafers and with the ends of at least one of said tube elements extending beyond each wafer, said cage holding means comprising a clamping means having narrow raised tongues and cooperating clamping means comprising a plate having a hole therein with a funnel edge and means for moving the clamping means and the cooperating clamping means together, said narrow raised tongues contacting said one of said wafers between said tube element ends and said funnel edge contacting at least a portion of the circumference of said other wafer.

6. In a cage holder for holding vacuum tube cages comprising parallelly arranged insulating wafers having indentations along the edge thereof, a centering guide fitting the wafers at the indentations, a plate mounted transversely of said centering guide, there being a hole having a funnel shaped edge in said plate, said guide extending through said plate adjacent the edge of said hole, and means to slide the cages along the guide with the wafers in contact with said guide.

7. In a cage holder for holding vacuum tube cages comprising parallelly arranged insulating wafers having indentations along the edge thereof, parallelly arranged guides fitting the wafers at the indentations, a plate mounted transversely of said centering guides, there being a hole having a funnel shaped edge in said plate, said guides extending through said plate adjacent the edge of said hole, and means for sliding the cage along the guides while the wafers are in contact with said guides.

8. In a cage holder for holding vacuum tube cages comprising parallelly arranged insulating wafers having indentations along the edges thereof, a centering guide fitting the wafer at the indentations, means for moving said cage transversely of said guide and parallel to said wafers to bring the wafers into contact with the guides at the indentations and a plate mounted transversely of said centering guide, there being a hole having a funnel shaped edge in said plate, said guide extending through said plate adjacent the edge of said hole, and means to slide a cage along said guide towards said plate.

9. In a cage holder for holding a vacuum tube cage comprising parallelly arranged insulating wafers having distinctively shaped portions along the edges thereof, a plurality of parallelly arranged guides, each guide fitting the wafers at said portions, means for moving said cage transversely of said guides and parallel to said wafers to bring said wafers into contact with said guides at said portions and a plate mounted transversely of said parallel guides, there being a hole having a funnel shaped edge in said plate, said guides extending through said plate adjacent the edge of said hole, and means to slide a cage along said guides toward said plate.

10. A cage holder for holding vacuum tube cages comprising parallelly arranged insulating wafers and tube elements arranged between the wafers with the ends of at least some of said elements extending beyond said wafers, said wafers having distinctively shaped portions along the edges thereof, said cage holder comprising a clamping means having narrow raised tongues, a cooperating clamping means comprising a plate having a hole therein with a funnel edge, centering guides comprising parallel rods arranged to fit the wafers at least in part at the distinctively shaped portions, means for moving the clamping means and the cooperating clamping means towards each other in a linear direction, and means for supporting said centering guides in a plane parallel to said linear direction, whereby said tongues will contact a side of one of said wafers between said element ends, said centering guide will contact the edges of the wafers at the distinctively shaped portions and the funnel edges will contact at least a portion of the periphery of another of said wafers.

11. A vacuum tube cage holder comprising a support, a plunger rotatable about an axis and slidable with respect to said support, a cage contactor on an end of said plunger, a clamping means rotatable with respect to said support and having a portion disposed transverse to said axis, spring means for urging said plunger towards said portion, said portion having a hole therein having funnel edges encompassing said axis.

12. A vacuum tube cage holder comprising a gear housing, a plunger rotatably movable about an axis and slidable with respect to said gear housing, a cage contactor on an end of said plunger, clamping means rotatable with respect to said gear housing and having a portion disposed traverse to said axis, spring means for urging said plunger towards said portion, said portion having a hole therein having funnel edges encompassing said axis, a gear in said gear housing rotatable about said axis and secured to said clamping means and slidably secured to said plunger, and a rack extending through said gear housing and in mesh with said gear.

13. A cage holder comprising a housing, a hollow spindle rotatably mounted in said housing, and extending therethrough, a frame fixed to said hollow spindle and having a first work engaging member extending transversely of the longitudinal axis of said spindle, a hollow plunger slidably mounted within said spindle, a gear on said spindle and means for fixing said gear, said spindle and said hollow plunger together for rotation, said hollow plunger having at one end thereof a second work engaging member oppositely disposed to said first work engaging member, a biasing spring within said hollow plunger for urging said second work engaging member toward said first work engaging member slidably, a rack mounted in said housing and meshing with said gear whereby said spindle and plunger may be rotated, said frame having a pair of work positioning elongated members extending between said work engaging members for positioning a cage received by said cage holder, and means at the other end of said hollow plunger to be engaged by a device for moving said plunger and said second work engaging member thereon away from the first work engaging means.

14. A cage holder comprising a housing, a hollow spindle rotatably mounted in said housing, and extending therethrough, a frame fixed to said hollow spindle and having a first cage engaging member extending transversely of the longitudinal axis of said spindle, a hollow plunger slidably mounted within said spindle and having elongated slots in opposite walls thereof extending longitudinally of said plunger, a gear on said spindle and a pin extending through said slots, said gear and said spindle for fixing said gear, said spindle and said hollow plunger together for rotation while permitting slidable movement between said spindle and said plunger, said hollow plunger having at one end thereof a second cage engaging member oppositely disposed to said first cage engaging member, a biasing spring within said hollow plunger positioned between said pin and said second cage engaging member on said hollow plunger, for urging said second cage engaging member toward said first cage engaging member, a rack slidably mounted in said housing and in contact with said gear for rotating said spindle and plunger, said frame having a pair of work positioning elongated members extending between said work engaging members for positioning a cage received by said cage holder, and means at the other end of said hollow plunger to be engaged by a device for moving said plunger and second cage engaging member thereon away from the first cage engaging means.

References Cited in the file of this patent

UNITED STATES PATENTS

| | | |
|---|---|---|
| 1,642,329 | Brown | Sept. 13, 1927 |
| 2,087,809 | Nichols | July 20, 1937 |
| 2,408,599 | Bennett | Oct. 1, 1946 |
| 2,417,472 | Dorff | Mar. 18, 1947 |
| 2,419,484 | Danziger | Apr. 22, 1947 |
| 2,756,863 | Laxo | July 31, 1956 |
| 2,818,158 | Brooks | Dec. 31, 1957 |
| 2,931,276 | Zerlin | Apr. 5, 1960 |